Dec. 24, 1957     N. F. NICKLES     2,817,559
AUTOMOBILE WINDSHIELD CONSTRUCTION

Filed Jan. 17, 1955     2 Sheets-Sheet 1

INVENTOR
Ned F. Nickles
BY
Paul Fitzpatrick
ATTORNEY

Dec. 24, 1957   N. F. NICKLES   2,817,559
AUTOMOBILE WINDSHIELD CONSTRUCTION
Filed Jan. 17, 1955   2 Sheets-Sheet 2

INVENTOR
Ned F. Nickles
BY
Paul Fitzpatrick
ATTORNEY

United States Patent Office 2,817,559
Patented Dec. 24, 1957

2,817,559

AUTOMOBILE WINDSHIELD CONSTRUCTION

Ned F. Nickles, Detroit, Mich., assignor to General Motors Corporation, Detroit, Mich., a corporation of Delaware Application January 17, 1955, Serial No. 482,149

1 Claim. (Cl. 296—84)

This invention relates to windshield construction for automotive vehicle bodies.

As an incidence of the progressive trend toward wider and lower vehicle body silhouette, improved visibility from the interior of vehicles has become a primary goal of the automotive designer. Of particular concern is the provision of a greater vertical and horizontal arc of forward vision through the windshield. In the past, even in vehicles of relatively high standing height, small windshields seriously curtailed the operator's range of vision and substantially increased normal driving hazards. With the recent adoption of the so-called wrap-around windshield in the majority of passenger vehicles, significant advances have been made in improving the operator's horizontal arc of vision. However, because of the common practice of suspending traffic indicators at relatively high levels at street intersections, it is particularly desirable that automobile windshields provide a substantially increased vertical angle of vision which will permit the operator to observe traffic signals at a distance reasonably proximate to the intersection.

An object of the present invention is to provide an automobile body and windshield construction permitting increased horizontal and vertical arcs of vision from the operator's position.

Another object is to provide one-piece automotive windshield, portions of which wrap around the vehicle body side walls and the other portions of which extend rearwardly into abutting relation with the top wall of the vehicle body, thereby affording wide angle side vision and a high vertical angle of vision.

These and other objects, advantages and features of the invention will become more fully apparent as reference is had to the accompanying specification and drawings wherein.

Figure 1:
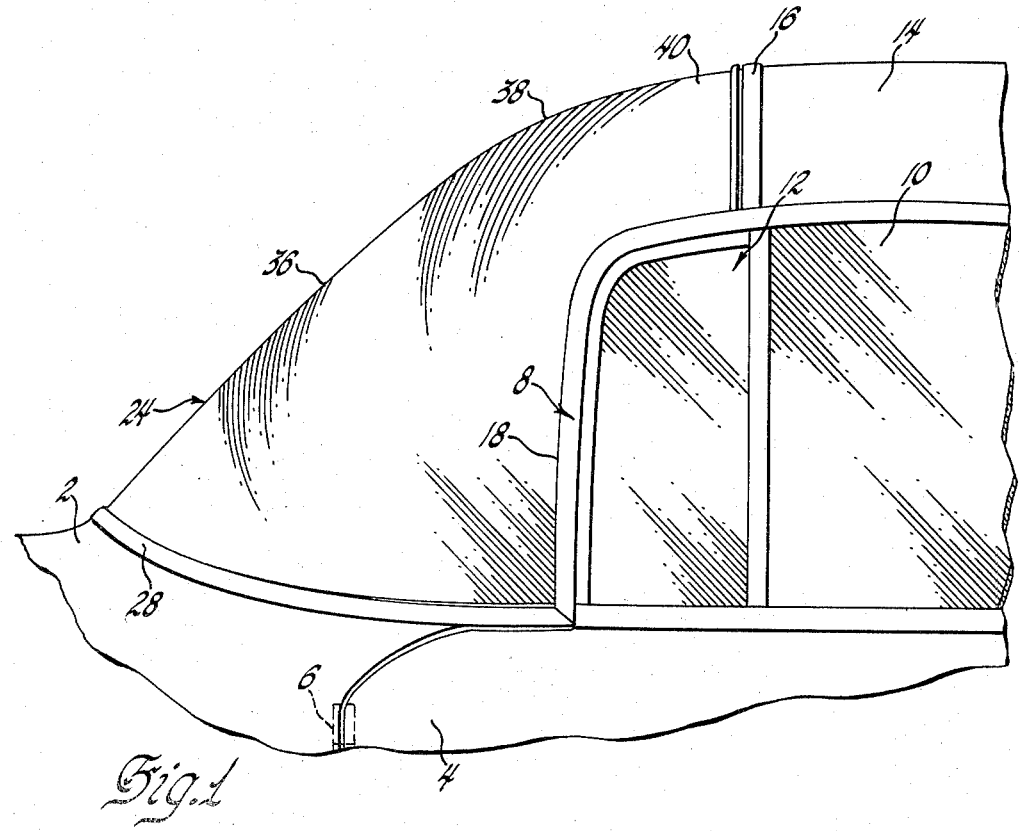
Fig. 1 is a fragmentary side elevational view of the upper front portion of a vehicle body illustrating the form and arrangement of the windshield therefor.

Referring now to the drawings and particularly Fig. 1, the reference numeral 2 designates generally the upper forward portion of a vehicle body immediately rearwardly adjacent the engine compartment. Body portion 2 is provided with the customary outwardly swingable front door 4 which is hinged thereto on a vertical disposed axis at 6. In common with vehicles equipped with the so-called wrap-around windshield, the hinge axis 6 is substantially forwardly displaced with respect to the windshield side pillars 8 in order to provide ample entrance space into the front seat of the vehicle. While only the left side of the vehicle is illustrated, it will be understood that the right side of the vehicle is identical.

In accordance with one feature of the invention, the windshield side pillars 8 rise substantially vertically to the level of the standing height of vehicle door windows 10 and ventilator window assemblies 12 associated therewith. Pillars 8 are then swept back in a gradual curvature to extend horizontally for connection with the vehicle roof structure 14. In the present invention, the forward edge of roof structure 14 terminates in a transversely extending windshield header 16 which is disposed substantially longitudinally rearwardly relative to the forward edges 18 of windshield side pillars 8. Header 16 is provided with a forwardly facing transversely extending channel portion 20 which is adapted to receive the upper rearwardly extending edge portion 22 of vehicle windshield 24. A similar channel construction 26 extends continuously along the belt line 28 of the vehicle from the forward edge of one windshield pillar 18 to the forward edge of the windshield pillar 18 at the opposite side of the vehicle. Similarly, the forward facing portions 18 of both windshield pillars 8 are formed with channels which receive the side edges 30 of windshield 24.

Figure 3:
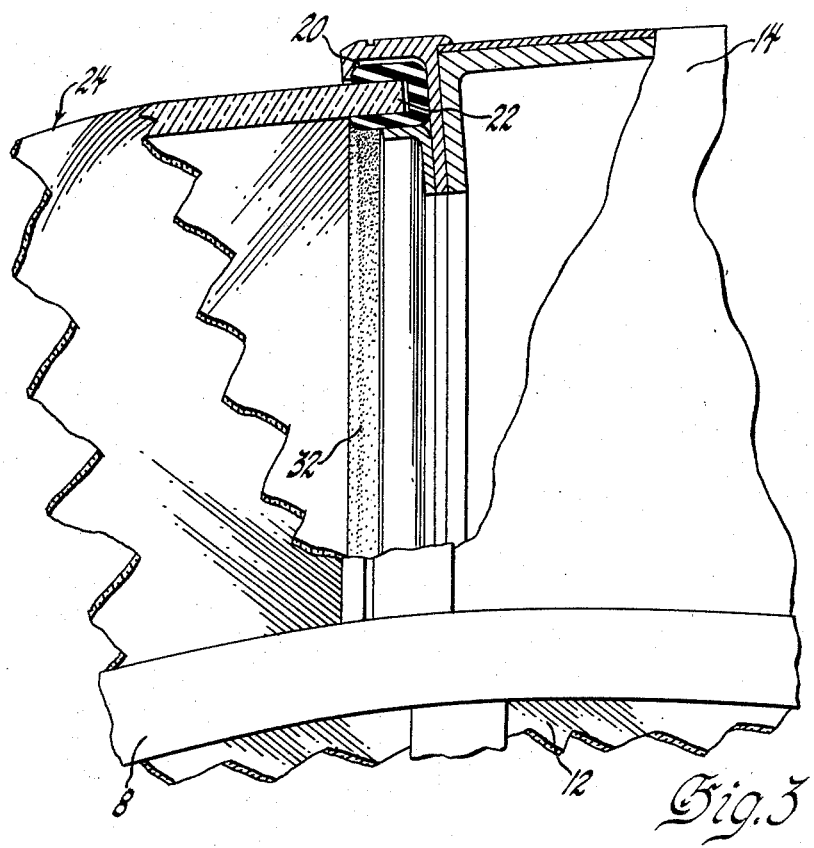
Fig. 3 is an enlarged fragmentary sectional elevational view illustrating the details of construction of the horizontal windshield header and the manner of engagement with the windshield.
Figure 4:
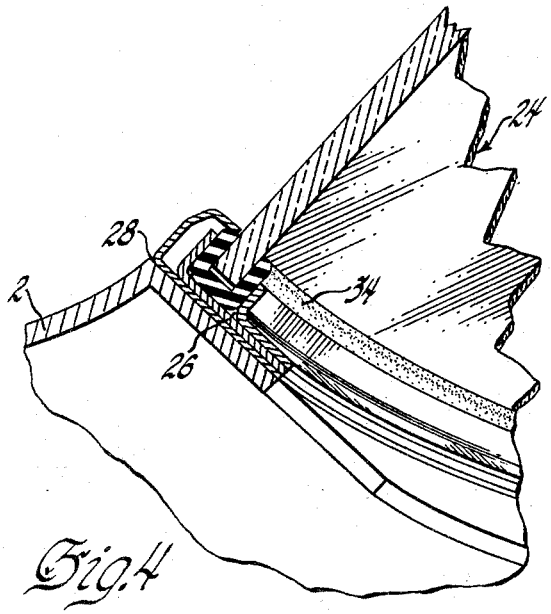
Fig. 4 is an enlarged fragmentary sectional elevational view showing the structure of the vehicle body at the juncture of the lower edge of the windshield and the vehicle body belt line.

As seen best in Figs. 3 and 4, channel portions 20 and 26 have disposed therein throughout their length resilient gasket members 32 and 34 of generally C-shaped cross section, which are formed and arranged to receive the perimetrical edges of the windshield. Gaskets 32 and 34 serve to insulate the windshield glass against direct contact with the metal structure of the body as well as provide a sealed juncture which prevents the entrance of rain, dust and other extraneous material into the interior of the vehicle.

Figure 2:
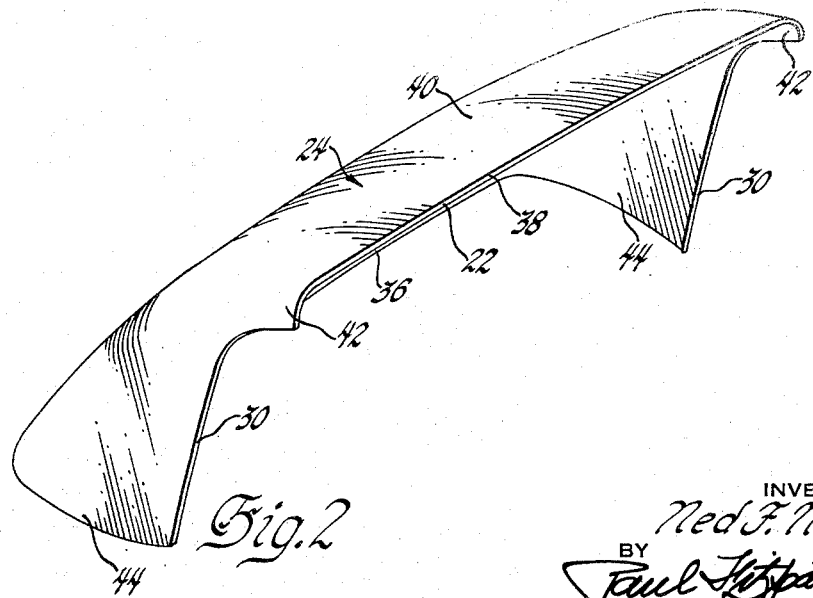
Fig. 2 is a perspective view of a windshield embodying the invention.

As seen in Figs. 1 and 2, in order to accomplish a substantial improvement in vertical angle of visibility in accordance with the present invention, the windshield glass 24 is formed with an inclined frontal portion 36 which is moderately curved in section and blends with a more sharply curved intermediate portion 38 terminating in a substantially horizontal position 40. In this manner the desired longitudinal spacing or frontal clearance between the vehicle operator's head and the inner surface of the windshield is maintained, yet greatly increased vertical angle of vision is afforded. It will, of course, be apparent that a windshield of straight inclined frontal surface virtually cancels the advantage otherwise obtainable from the rearwardly displaced location of the windshield header 16, since the low angle of rearward and upward slope resulting therefrom would necessitate repositioning the operator's seat rearwardly. It will also be noted (Fig. 2) that the lateral extremities 42 of horizontal portion 40 of windshield 24 curve downwardly to blend with the rearwardly directed side walls 44 of windshield 24. There is thus provided a further range of lateral visibility hitherto unobtainable in automotive windshield constructions.

While but one embodiment of the invention has been shown and described, it will be understood that numerous changes and modifications may be made therein. It is, therefore, to be understood that it is not intended to limit the invention to the embodiment shown but only by the scope of the claim which follows.

I claim:

In a closed vehicle body, the combination of a pair of transversely spaced generally vertically extending windshield side pillars, each of said pillars having horizontally rearwardly directed portions on the upper ends thereof, a vehicle door at each side of said body, each door being hinged to a vertically extending axis disposed substantially forwardly of the adjacent vertically extending side pillar, a ventilator window mounted in each of said doors and having a portion of its perimeter in abutting relation with the vertically and horizontally extending portion of the adjacent windshield side pillar, a transversely disposed windshield header extending between said horizontally directed portions in rearwardly spaced relation from said vertically extending pillar, said header being disposed in substantial alignment with the rearward extremity of said ventilator windows, and an optically flat one-piece transparent windshield of compound curvature disposed transversely on said body forwardly of said pillars, said windshield having longitudinally swept back lateral extremities abuttingly engaging said vertical pillars and a horizontal swept back upper extremity abuttingly engaging said windshield header, said pillars and header being formed with a continuous channel portion adapted to overlap the terminal edges of said swept back lateral and horizontal extremities, and resilient seal means carried by said channel adapted to cushion said terminal edges against contact with said channel.

References Cited in the file of this patent

UNITED STATES PATENTS

| | | |
|---|---|---|
| D. 139,455 | Walker | Nov. 14, 1944 |
| 1,975,372 | Potter | Oct. 2, 1934 |
| 2,401,961 | Rappl | June 11, 1946 |
| 2,620,221 | Romano | Dec. 2, 1952 |
| 2,719,749 | Richards | Oct. 4, 1955 |

FOREIGN PATENTS

| | | |
|---|---|---|
| 266,239 | Germany | Oct. 20, 1913 |
| 246,162 | Switzerland | Sept. 1, 1947 |

OTHER REFERENCES

S. A. E. Journal, March 1944, "Bohn," page 91.
S. A. E. Journal, August 1944, "Bohn," page 113.